Nov. 15, 1927.  1,649,039
O. PAHOMI
WAFFLE IRON
Filed Nov. 28, 1925  2 Sheets-Sheet 2
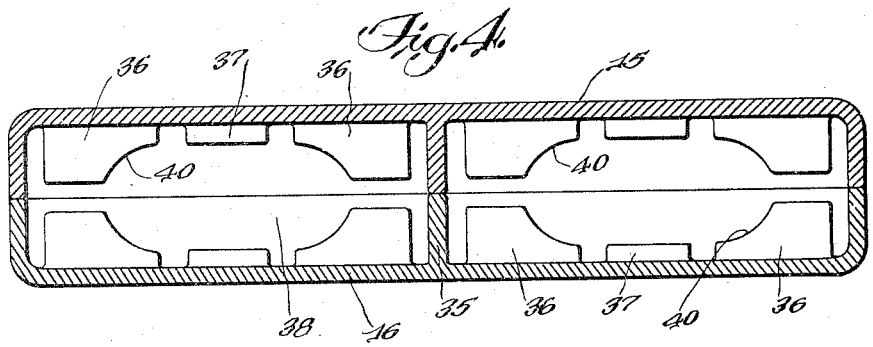
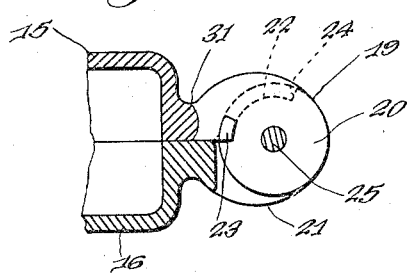
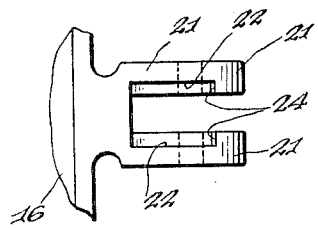
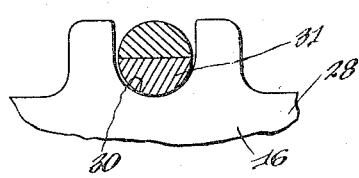
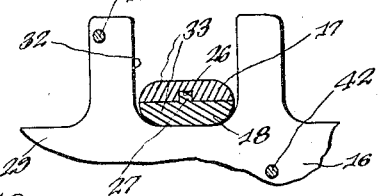
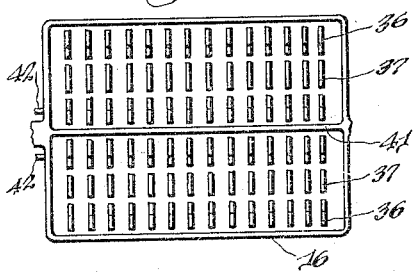
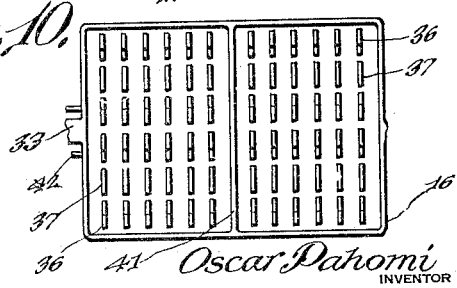
Oscar Pahomi
INVENTOR
BY Victor J. Evans
ATTORNEY Patented Nov. 15, 1927.

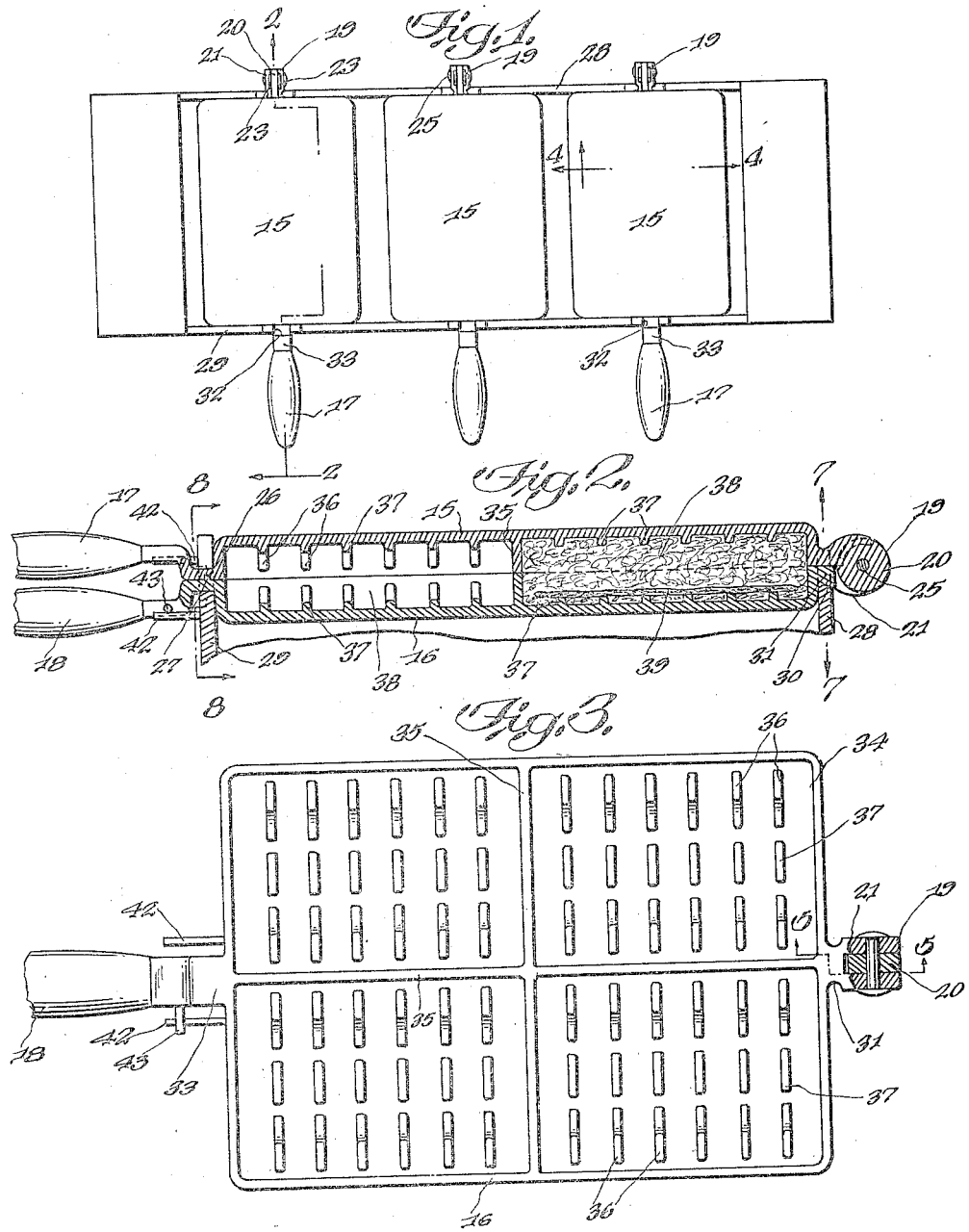

1,649,039

UNITED STATES PATENT OFFICE.

OSCAR PAHOMI, OF CHICAGO, ILLINOIS.

WAFFLE IRON.

Application filed November 28, 1925. Serial No. 72,046.

This invention relates to certain new and useful improvements in waffle irons and has for its principal object the provision of a device of this character which will be highly efficient in use and economical in manufacture.

A further object of this invention is the production of a device of this character wherein provision is made for turning the iron over a flame without lifting the same from its support and wherein provision is made for retaining the iron in position over the flame.

A further object of the invention is the production of a device of this character wherein provision is made for a dough chamber having a portion adapted for the reception of an edible, such for example a slice of bacon or sausage or the like, wherein the edible will be baked within the dough in sandwich formation.

Other objects will appear hereinafter.

The invention consists in the novel combination and arrangement of parts to be hereinafter described and claimed.

The invention will be best understood by reference to the accompanying drawings illustrating the preferred form of my invention and in which:

Fig. 1 is a plan view showing a number of waffle irons embodying the invention mounted in operative position, Fig. 2 is a sectional view of the same taken substantially on line 2—2 of Fig. 1, Fig. 3 is a plan view showing one of the mold plates embodied in the invention, Fig. 4 is a sectional view taken substantially on line 4—4 of Fig. 1, Fig. 5 is a sectional view taken substantially on line 5—5 of Fig. 3, Fig. 6 is a detail view of one of the hinge leaves embodied in the invention, Fig. 7 is a sectional detail view taken substantially on line 7—7 of Fig. 2, Fig. 8 is a detailed sectional view taken substantially on line 8—8 of Fig. 2, and Figs. 9 and 10 are top plan views of mold plates showing a modified form of construction.

In carrying out the objects of the invention I provide a waffle iron including cooperating mold plates 15 and 16 provided with handle portions 17 and 18 hinged together opposite the handle portions as at 19. This hinge connection includes a substantially circular shaped hinge leaf 20 formed as an integral part of the mold plate 15 and disposed in a slotted hinge leaf 21 also circular in shape and having working grooves 22 adapted to accommodate lateral stop lugs 23 formed on the hinge leaf 20. The grooves 22 terminate into shoulders 24 which are adapted for engagement with the stop lugs 23 to limit swinging of one of the mold plates relative to the other mold plate about its hinge pin 25.

The handle portion 17 has a hole 26 formed therein adapted to receive and accommodate a guide pin 27 formed on the handle portion 18. The pin and hole above described facilitates the positioning together of the mold plates when mounted on supports for baking purposes. The waffle iron is adapted to be removably mounted on vertical supports 28 and 29 forming a portion of the stove or other heating element over which the waffle iron is supported. The support 28 has a rounded notch 30 formed therein adapted to receive the neck portion 31 of the hinge connection and the support 29 has an elongated notch 32 formed therein adapted to accommodate the shank 33 of the handle portions.

As illustrated in Fig. 1 the support can be made to receive one or more waffle irons similar in structure to the waffle iron above described.

From the above description it is apparent that the waffle iron can be rotated upon the supports to change the positions of the mold plates with respect to each other and that such construction facilitates the ready removal of the waffle iron from its support.

The mold plate illustrated in Figs. 2–4 inclusive includes separate molds 34 whereby four waffles may be baked at the same time. These molds are separated by means of intersecting partitions 35 and each mold has formed therein aligned parallel spaced projections 36 and 37, the projections 37 being shorter in height than the projections 35 to provide a space 38 for the accommodation of an edible 39 such for example a slice of bacon, link of sausage or the like. As illustrated the corners of the projections 36 adjacent the projections 37 are convexly curved as at 40 to provide with the projections 37 an unobstructed space 38 for the purposes herein described. The projections 37 serve to support the edible in spaced relation with the adjacent inside wall surfaces of the mold plates to permit the dough to freely flow therebetween beneath the edible.

Referring particularly to Figs. 9 and 10 I illustrate mold plates which are divided by partitions 41 to form different shapes and sizes of waffles than the mold plates illustrated in Fig. 3, the construction of these mold plates being otherwise the same.

I also provide means for limiting rotation of the waffle iron wherein the irons will rest in a flat horizontal position as illustrated in Fig. 1. This provision includes spaced lateral projecting pins 42 carried by the support 29 and adapted for engagement with a stop 43 carried by the handle portion 18. It is evident from the description herein that upon rotation of the waffle iron the rotation is limited by engagement of the stop pin 43 with the pins 42.

It is evident from the description herein and from the disclosure of the drawings that I provide a waffle iron wherein an edible can be placed therein and be completely covered by the waffle dough and baked with the dough in sandwich formation.

In baking a waffle sandwich the waffle mold plates are swung to permit access to the interior thereof and an edible is placed in the unobstructed space 38 of one of the plates and the waffle dough is poured into that plate completely covering the edible. When a sufficient amount of dough has been placed in the plate, the other plate of the iron is swung to encase the dough and the waffle iron is then placed over a heating element to begin the baking process, the iron being rotated when necessary for known reasons.

While I have shown and described the preferred form of my invention it is to be understood that various changes and alterations may be carried out during manufacture without departing from the spirit of the invention or the scope of the appended claim.

The invention having been set forth what I claim as new and useful is:—

A waffle iron including mold plates having spaced projections varying in heights arranged in parallel rows with certain of the projections curved convexly at their corners to provide with the shorter of the projections an unobstructed space for the accommodation of an edible, means providing a hinged conection between the plates, handle portions carried by the plates, and a support for the plates including a supporting member having a rounded notch for the reception of a neck portion of the hinge connection and having an elongated notch for the reception of the shank portion of the handles, spaced laterally extending pins on said elongated notch adapted to be engaged by a pin carried on the shank portion of said handles, said pins acting to limit the rotary movement of the plates on the support.

In testimony whereof I affix my signature.

OSCAR PAHOMI.